J. MOON.

Improvement in Sled-Brakes.

No. 127,503.                                   Patented June 4, 1872.

Witnesses:
John Becker.
Geo. W. Mabee

Inventor:
J. Moon
PER
Attorneys.

127,503

UNITED STATES PATENT OFFICE.

JONATHAN MOON, OF SPRING VALLEY, MINNESOTA.

IMPROVEMENT IN SLED-BRAKES.

Specification forming part of Letters Patent No. 127,503, dated June 4, 1872.

*To all whom it may concern:*

Be it known that I, JONATHAN MOON, of Spring Valley, in the county of Fillmore and State of Minnesota, have invented a new and Improved Sled-Brake; and I do hereby declare that the following is a full, clear, and exact description thereof, which will enable others skilled in the art to make and use the same, reference being had to the accompanying drawing forming part of this specification, in which—

Figure 1:
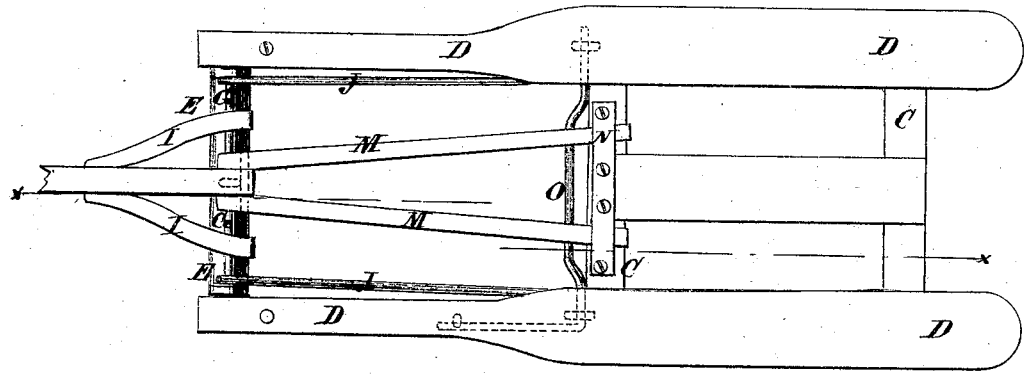
Figure 2:
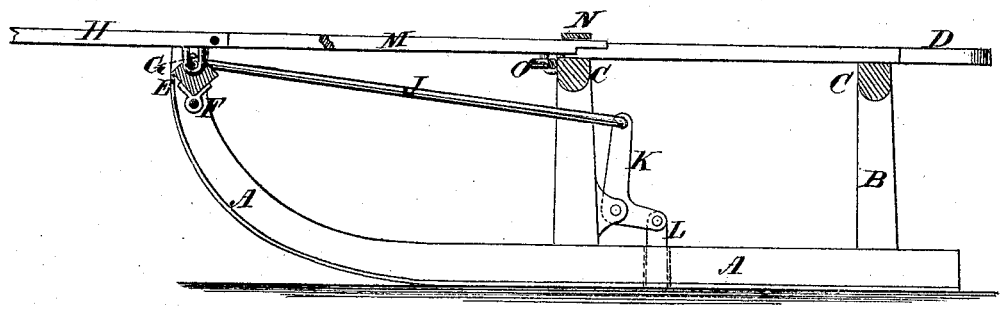

Figure 1 is a top view of a sled to which my improved brake has been attached. Fig. 2 is a detail longitudinal section of the same taken through the line $x\,x$, Fig. 1.

Similar letters of reference indicate corresponding parts.

My invention has for its object to furnish a simple, convenient, reliable, and automatic sled-brake, which shall be so arranged as to apply the brake whenever the sled tends to move faster than the horses, and with a force proportioned to the forward pressure of the sled; and it consists in the construction and combination of the various parts of the brake, as hereinafter more fully described.

A are the runners, B are the knees, C are the beams, and D are the raves of the sled, about the construction of which parts there is nothing new. E is the roller, which is made square, and to the diagonal corners of which are firmly secured two rods, F and G. The lower rod F extends through the runners A, and eccentrically pivots the said roller to the said runners. The upper rod G does not extend to the runners A, and to it are pivoted the rear end of the tongue H and of the tongue-hounds or braces I. To the upper rod G, near its ends, is also pivoted the forward ends of the two connecting-rods J, the rear ends of which are pivoted to the ends of the upper or longer arms of the bent levers K. The levers K are pivoted at their angles to the lower part of the rear sides of the forward knees B. To the ends of the lower or shorter arms of the levers K are pivoted the dogs L, which pass down through holes in the runners A, so that when pushed downward they may take hold of the roadway and retard or stop the advance of the sled. By this construction, when the sled tends to move faster than the horses the forward pressure of the sled carries the lower angle of the roller E forward, while the tongue H presses the upper angle of said roller backward, causing the rods J to operate the levers K to project the dogs and retard the sled. As soon as the horses again begin to draw the reverse movements take place, and the dogs L are again drawn up into the runners. To the rear end of the tongue H are pivoted the forward ends of the bars M, the rear ends of which pass through keepers N attached to the upper side of the forward beam C. The rear ends of the bars M have shoulders formed upon their under sides in such positions that when the sled is being drawn forward the said shoulders will drop down upon the forward side of the forward beam C so as to prevent the dogs from being forced out by the forward pressure of the sled or by backward pressure upon the tongue. The rear ends of the bars M are held up, so that their shoulders cannot take hold of the beam C by the eccentric, cam, or crank-rod O, the ends of which work in bearings attached to the beam C or raves D, and to one end of which is attached, or upon it is formed, a lever, P, extending into such a position that it may be reached and operated by the driver. By this construction, by operating the eccentric rod O by means of the lever P, the shoulders of the bars M are allowed to take hold of the beam C, so that the sled may be backed without projecting the dogs L.

Having thus described my invention, I claim as new and desire to secure by Letters Patent—

1. The combination of the bars M, having shoulders formed upon the under sides of their rear ends, with the rods G, roller E, tongue H, and beam C, substantially as herein shown and described, and for the purpose set forth.

2. The combination of the eccentric or cam-rod O and lever P with the bars M and sled A B C, substantially as herein shown and described, and for the purpose set forth.

JONATHAN MOON.

Witnesses:
 J. J. MARTIN,
 SAMUEL BOYER.